United States Patent

Pronk et al.

[11] Patent Number: 5,917,683
[45] Date of Patent: Jun. 29, 1999

[54] THIN-FILM MAGNETIC HEAD WITH AUXILIARY CONDUCTING TRACKS

[75] Inventors: Franciscus A. Pronk; Arie H. Van Heeren; Eeltje A. Draaisma, all of Eindhoven, Netherlands

[73] Assignee: U.S. Philips Corporation, New York, N.Y.

[21] Appl. No.: 08/039,552

[22] Filed: Mar. 29, 1993

Related U.S. Application Data

[63] Continuation of application No. 07/686,905, Apr. 17, 1991, abandoned.

[30] Foreign Application Priority Data

May 17, 1990 [NL] Netherlands ............................ 9001147

[51] Int. Cl.⁶ ................................ G11B 5/31; G11B 5/17
[52] U.S. Cl. ............................................ 360/126; 360/123
[58] Field of Search .................................. 360/126, 123, 360/110, 125

[56] References Cited

U.S. PATENT DOCUMENTS

| | | | |
|---|---|---|---|
| 3,891,995 | 6/1975 | Harazono et al. | 360/123 |
| 4,044,394 | 8/1977 | Hanazono et al. | 360/123 |
| 4,190,872 | 2/1980 | Jones, Jr. et al. | 360/123 |
| 4,191,982 | 3/1980 | Wood et al. | 360/123 |
| 4,219,854 | 8/1980 | Church et al. | 360/125 |
| 4,625,250 | 11/1986 | Shibata | 360/125 |
| 4,672,495 | 6/1987 | Matsumoto | 360/125 |
| 4,684,438 | 8/1987 | Lazzari | 360/123 |
| 4,713,711 | 12/1987 | Jones, Jr. et al. | 360/125 |
| 4,760,481 | 7/1988 | Yuito et al. | 360/123 |
| 4,804,816 | 2/1989 | Hata | 360/126 |
| 4,949,209 | 8/1990 | Imanaka et al. | 360/123 |
| 5,022,141 | 6/1991 | Nagata et al. | 360/123 |
| 5,065,270 | 11/1991 | Koyanagi et al. | 360/123 |

FOREIGN PATENT DOCUMENTS

62-128011  6/1987  Japan ..................................... 360/126

OTHER PUBLICATIONS

"Thin Film and Thin–Film/Ferrite Hybrid Magnetic Heads", Romankiw et al., IBM Technical Disclosure Bulletin, vol. 18, No. 1, pp. 19–22, Jun. '75.

*Primary Examiner*—Craig A. Renner
*Attorney, Agent, or Firm*—Norman N. Spain

[57] ABSTRACT

A thin-film magnetic head (101) includes windings assembled from two levels (105, 106) having two electrically conducting layers (103, 104), each including a connecting track (107, 116) and a winding (110, 113). To reduce the electrical resistance, auxiliary tracks (130, 131) which are in contact with the connecting tracks and also form part of the layers extend parallel to the connecting tracks. Consequently, no additional manufacturing steps are required.

10 Claims, 3 Drawing Sheets

THIN-FILM MAGNETIC HEAD WITH AUXILIARY CONDUCTING TRACKS

This is a continuation of application Ser. No. 07/686,905, filed Apr. 17, 1991 abandoned.

BACKGROUND OF THE INVENTION

The invention relates to a thin-film magnetic head structure comprising on a substrate a flux conductor layer and two electrically conducting layers, which electrically conducting layers are each located one above the other at separate levels, and which are partly located between the substrate and the flux conductor layer, the first layer including a first winding having a first through-connection end and a first connecting track having a first connecting end, and the second layer including a second winding having a second through-connection end, and a second connecting track having a second connecting end, the through-connection ends being interconnected and the connecting tracks being adjacent to each other.

Such a structure is generally known for a thin-film writing head. For writing a signal, a current is sent through the winding via the connecting tracks. As the connecting tracks and the winding have a resistance, heat will develop. With the tendency toward smaller magnetic head dimensions, especially narrower magnetic heads, the dimensions of the windings and more specifically those of the connecting tracks also become smaller. As the resistance depends on the cross-section of the current conductors, in this case inter alia the connecting tracks, the resistance and consequently the heat developed during operation will increase, which may cause problems, such as poor functioning or even breakdown of the magnetic head.

OBJECTS AND SUMMARY OF THE INVENTION

The object of an invention is to provide a thin-film magnetic head having smaller dimensions, in which no impermissibly high heat development during operation occurs.

To this end the thin-film magnetic head according to the invention, is characterized in that located parallel to and at a different level than the second connecting track there is a first electrically conducting auxiliary track which has one of its ends connected to the second connecting track and its other end connected to a portion of the second connecting track which is connected to the second winding and in that located parallel to and at a different level than the first connecting track there is a second auxiliary track which has one of its ends connected to the first connecting end of the first connecting track and its other end connected to a portion of the first connecting track connected to the first winding. As a result thereof the connecting tracks and the auxiliary tracks together form current conductors of sufficiently large dimensions, so that the resistance is low and the heat development is limited.

To provide a proper connection between the auxiliary track and the connecting track, an embodiment of the thin-film magnetic head according to the invention is characterized, in that the first auxiliary track is in contact with the second connecting track and in that the second auxiliary track is in contact with the first connecting track along substantially the overall length of the first connecting track.

A practical embodiment of the thin-film writing head according to the invention is characterized in that the connecting tracks have a width which is at least substantially equal to the width of the auxiliary tracks.

A further embodiment of the thin-film magnetic head according to the invention is characterized in that the first and the second auxiliary tracks, respectively, form part of the first and the second electrically conducting layer, respectively. As the windings of the magnetic head are assembled from several electrically conducting layers, no additional manufacturing steps are needed for the deposition of the auxiliary tracks. Only the edge masks must be adapted so that in the region of the connections of the auxiliary tracks to the connecting track the insulation layer deposited on the connecting tracks is removed.

A still further embodiment of the thin-film magnetic head of the invention is characterized in that the auxiliary tracks form part of the flux conductor layer, and in that the flux conductor layer is electrically conducting.

BRIEF DESCRIPTION OF THE DRAWING

The invention will now be described in greater detail with reference to an embodiment of the thin-film magnetic head according to the invention, shown in the accompanying Figures.

DESCRIPTION OF THE PREFERRED EMBODIMENTS

Figure 1:
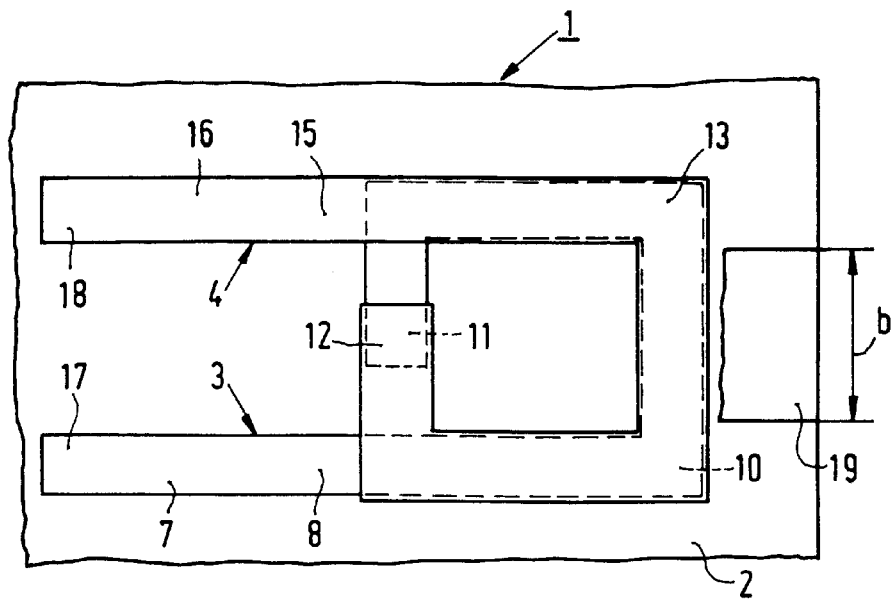
FIG. 1 shows windings of a prior art thin-film writing head.

FIG. 1 shows of a prior art thin-film writing head 1 provided on a substrate 2. The winding turns are assembled from two electrically conducting layers 3, 4, which, taken in a direction perpendicular to the substrate 2, are located one on top of the other, at two different levels 5, 6 (see FIG. 2). The first layer 3 is located on the substrate 2 and has a first connecting track 7 having a first connecting end 17 and a first winding 10, which has a first through-connection end 11 connected to a second throughc-onnection end 12 of a second winding 13 of the second layer 4, located on the layer 3, and in addition contains a second connecting track 16, having a second connecting end 18. External means may be connected to the connecting ends.

Figure 2:
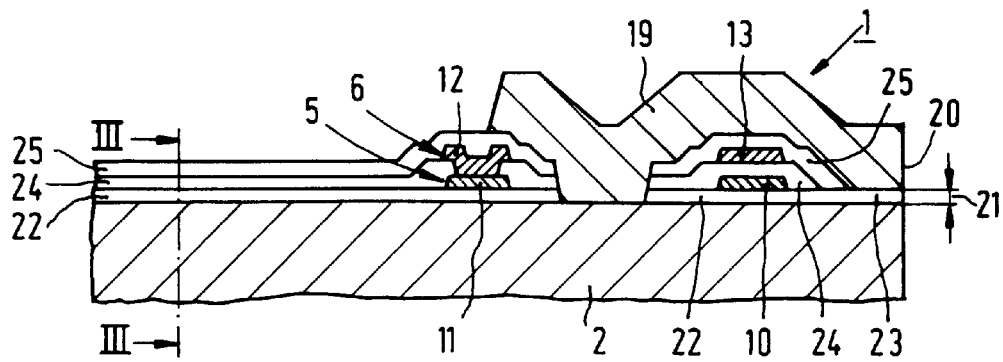
FIG. 2 is a cross-sectional view of a prior art thin-film writing head provided with the windings of FIG. 1.

FIG. 2 is a cross-sectional view of prior art thin-film writing head 1 provided with the windings shown in FIG. 1. The substrate 2 functions as a first flux conductor on a portion the electrically conducting layers, a second flux conductor layer 19 is located which extends to a head face 20, with a spacing 21 from the substrate, the spacing 21 being defined by an insulating layer 22 and constituting a transducing gap 23. In the middle of the windings 10, 13, layer 19 is connected to the substrate 2. Insulating layers 22, 24 and 25 are present between the flux conductor layer 19, the substrate 2 and the layers 3, 4. Portions 8 and 15 of conducting tracks 7 and 16 are in contact with the first and second windings 10 and 13, respectively.

Figure 3:
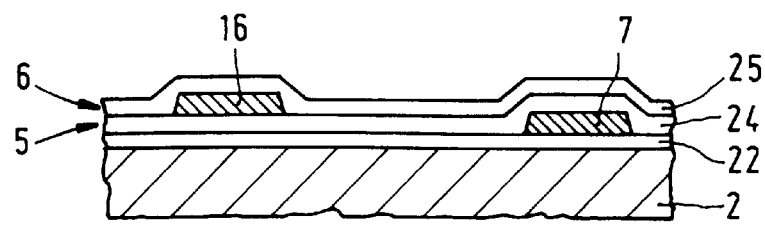
FIG. 3 is a cross-sectional view of the prior art thin-film writing head in the region of the connecting tracks of the writing head.

FIG. 3 is a cross-sectional view along line III—III of FIG. 2, parallel to the head face 20 in the region of the connecting tracks 7, 16. The connecting tracks extend parallel to each other at different levels 5, 6.

Figure 4:
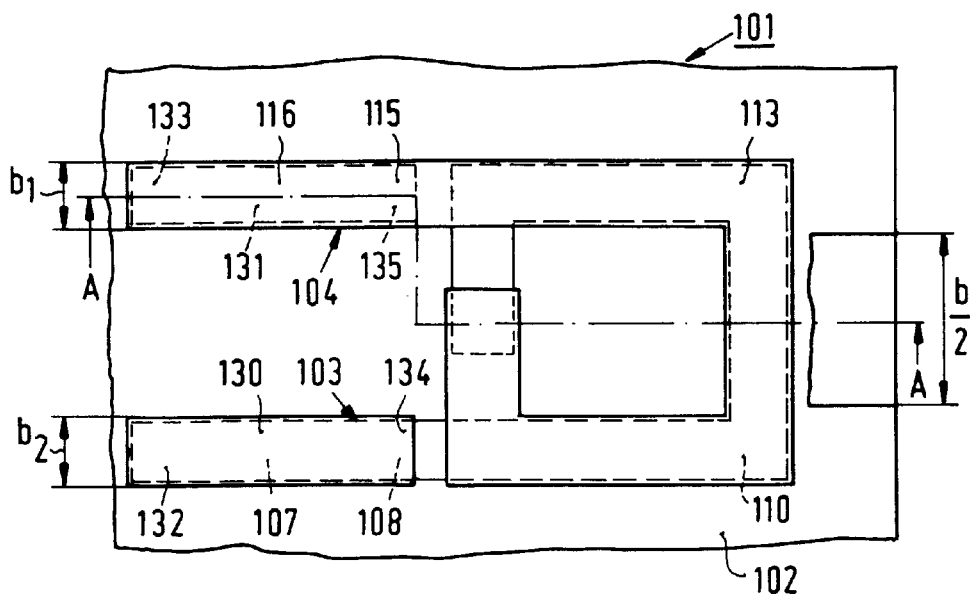
FIG. 4 shows windings of the thin-film writing head in accordance with the invention.

In the case of a multitrack recording system, for example, for the purpose of obtaining higher information densities on a magnetic recording medium, the gap width b of a multitrack writing head must be reduced, eg., halved (see FIG. 1 and 4). Also, the dimensions of the connecting tracks 7, 16 and of the windings 10, 13 must be reduced, e.g., halved. When the layer thicknesses remain the same, this increases the resistance of the connecting tracks and the windings. Since only the dimensions in a direction parallel to the head face 20 must be halved and the dimensions in a direction perpendicular to the head face can remain the same, the resistance in the connecting tracks increases to a greater extent than the resistance in the windings. To reduce the heat developed during operation due to the increased resistance, enlarging the cross-sections of the connecting tracks has the best effect. It is also very difficult to enlarge the cross-sections of the windings, as this changes the ratios between the height and the other head dimensions, which may have detrimental effects. To that end, an improved thin-film magnetic head according to the invention, having a lower resistance, is provided with auxiliary tracks which are situated above and below the connecting tracks and contact the connecting tracks.

FIG. 4 shows electrically conducting layers 103, 104, present on a substrate 102, of the thin-film writing head 101 of the invention. In addition to connecting tracks 107, 116 and windings 110, 113, these patterns are provided with first and a second auxiliary tracks 131, 130. The auxiliary tracks have the same width $b_2$ as the width $b_1$ of the connecting tracks. Respective ends 132 and 133 of the second and first auxiliary tracks 130, 131, respectively, are connected to the first and the second connecting tracks 107, 116, respectively. Furthermore, the further ends 134 and 135, respectively, of the respective second and first auxiliary tracks, 130, 131 are connected to portion 108, 115 of the first and second connecting tracks 107, 116, respectively, which portion is in contact with the first and second windings 110, 113, respectively.

Figure 5:
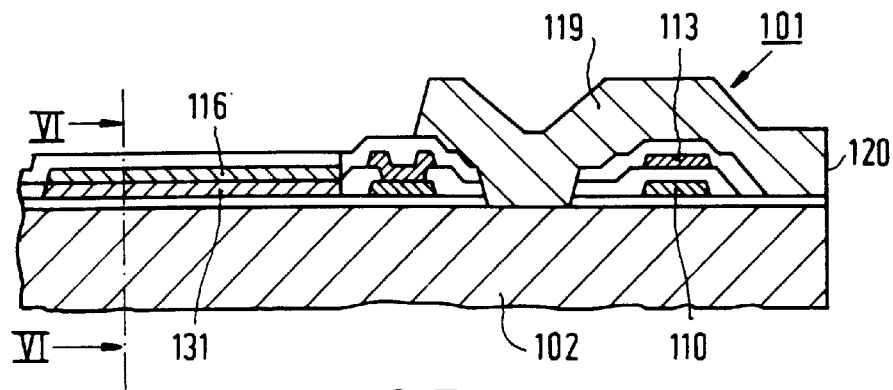
FIG. 5 is a cross-sectional view of the thin-film writing head in accordance with the invention, provided with the windings shown in FIG. 4.

FIG. 5 is a cross-sectional view of the writing head 101 in accordance with the invention, provided with the windings shown in FIG. 4 taken in the direction of the cross-section A—A. Also with this writing head the substrate 102 acts as a flux conductor and the substrate forms a, magnetic yoke together with the flux conductor layer 119. The first auxiliary track 131, belonging to the first layer, is located under the second connecting track 116 of the second layer and connects the second connecting track along substantially the overall length of the second connecting track 116. The second auxiliary track 130 belonging to the second layer is located above the first connecting track 107 of the first layer and is in contact with the first connecting track 107 along substantially the overall length of the first connecting track 107.

Figure 6:
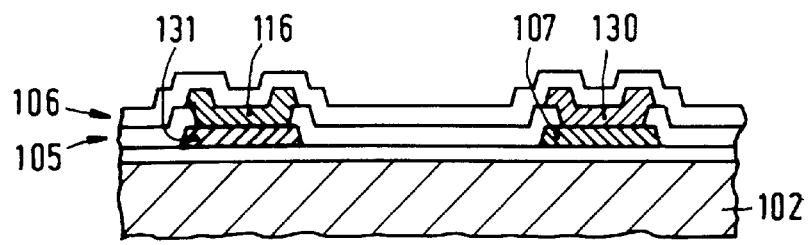
FIG. 6 is a cross-sectional view of the thin-film writing head in accordance with the invention, in the region of the writing head.

FIG. 6 is a cross-sectional view along line VI—VI of FIG. 5, parallel to the head face 120 in the region of the connecting tracks and auxiliary tracks of the writing head 101. The auxiliary tracks 130 and 131 are produced during the same process steps as those by means of which the windings and the connecting tracks are produced and are located at the same levels 105, 106 as the layers 103 and 104.

Figure 7:
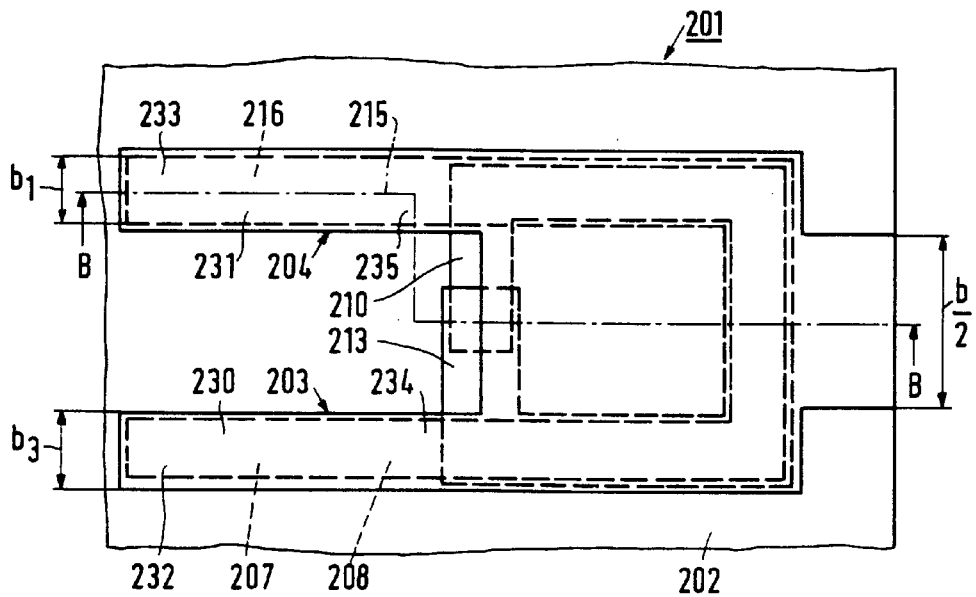
FIG. 7 is a view of the structure of a further embodiment of the thin-film writing head in accordance with the invention.

FIG. 7 shows a further embodiment of the thin-film writing head 201 of the invention with electrically conducting layers 203, 204, present on a substrate 202. In addition to connecting tracks 207, 216 and windings 210, 213, these patterns are provided with a first and a second auxiliary track 231, 230. The auxiliary tracks 230 and 231 are actually part of flux conductor layer 219, which is made of an electrically conducting material. The auxiliary tracks have at least substantially the same width $b_3$ as the width $b_1$ of the connecting tracks. Respective ends 232 and 233 of the second and first auxiliary track 230, 231, respectively, are connected to the first and the second connecting track 207, 216, respectively. Furthermore, the further ends 234 and 235, respectively, of the respective second and first auxiliary track 230, 231 are connected to portion 208, 215 of the first and second connecting track 207, 216, respectively, which portion is in contact with the first and second windings 210, 213, respectively.

Figure 8:
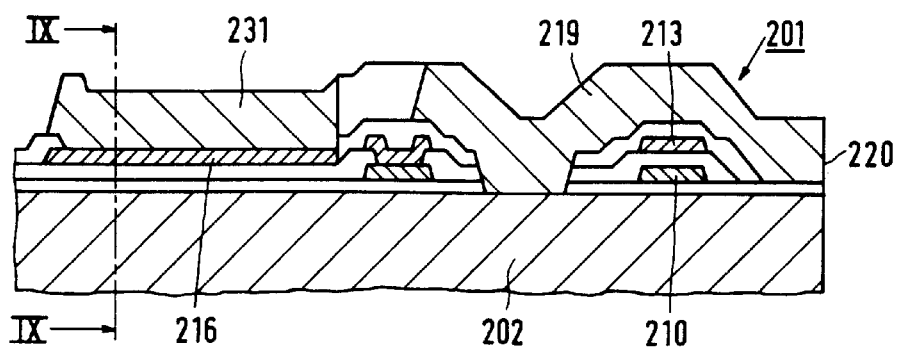
FIG. 8 is a cross-sectional view of the structure shown in FIG. 7.

FIG. 8 is a cross-sectional view of the writing head 201 in accordance with the invention, provided with the structure shown in FIG. 7 taken in the direction of the cross-section B—B. With this writing head, the substrate 202 also acts as a flux conductor and the substrate together with the flux conductor layer 219 forms a magnetic yoke. The auxiliary tracks 230 and 231 contact the connecting tracks along substantially the overall length of the connecting tracks 207 and 216.

Figure 9:
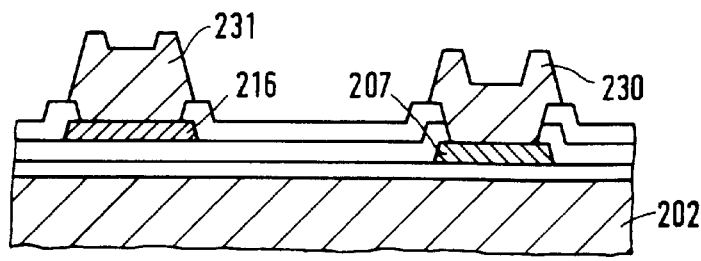
FIG. 9 is a cross-sectional view of the structure in the region of the connecting tracks of the thin-film writing head.

FIG. 9 is a cross-sectional view along line IX—IX of FIG. 8, parallel to the head face 220 in the region of the connecting tracks and auxiliary tracks of the writing head 201. The auxiliary tracks 230 and 231 are produced during the same process steps as those by means of which the flux conductor layer 219 is produced and are located above the connecting tracks 207 and 216.

It should be noted that the invention is not limited to the embodiment shown here. Also other head structures can be adapted in the same manner, for example read heads and combined write-read heads.

We claim:

1. A thin-film magnetic head, comprising a thin film structure on a substrate, the structure comprising a flux conductor layer and first and second electrically conducting layers, which electrical conducting layers are located one above the other at separate levels, and are at least partly located between the substrate and the flux conductor layer, the first layer including a first winding having a first through-connection end, and a first connecting track as an integral extension of, and on the same level as the first winding, and having a first connecting end, and the second layer including a second winding having a second through-connection end, and a second connecting track as an integral extension of, and on the same level as the second winding and having a second connecting end, the through-connection ends being interconnected and the connecting tracks being adjacent to each other, characterized in that a first electrically conducting auxiliary track is located parallel to and at a different level than the second connecting track, in that one end of the first auxiliary track is connected to the second connecting track and the other end is connected to a portion of the second connecting track which is connected to the second winding, and in that a second auxiliary track is located parallel to and at a different level than the first connecting track, in that one end of the second auxiliary track is connected to the first connecting track and the other end is connected to a portion of the first connecting track connected to the first winding.

2. A thin-film magnetic head as claimed in claim 1, characterized in that the first and second auxiliary tracks, respectively, are part of the first and second electrically conducting layers, respectively.

3. A thin-film magnetic head as claimed in claim 1, characterized in that the auxiliary tracks are part of the flux conductor layer and that the flux conductor layer is electrically conducting.

4. A thin-film magnetic head as claimed in claim 1, characterized in that the connecting tracks have a width which is substantially the same as the width of the auxiliary tracks.

5. A thin-film magnetic head as claimed in claim 4, characterized in that the first and second auxiliary tracks, respectively, are part of the first and second electrically conducting layers, respectively.

6. A thin-film magnetic head as claimed in claim 4, characterized in that the auxiliary tracks are part of the flux conductor layer and that the flux conductor layer is electrically conducting.

7. A thin-film magnetic bead as claimed in claim 1, characterized in that the first auxiliary track contacts the second connecting track along substantially the entire length of the second connecting track, and that the second auxiliary track connects the first connecting track along substantially the entire length of the first connecting track.

8. A thin-film magnetic head as claimed in claim 7, characterized in that the connecting tracks have a width which is substantially the same as the width of the auxiliary tracks.

9. A thin-film magnetic head as claimed in claim 7, characterized in that the auxiliary tracks are part of the flux conductor layer and that the flux conductor layer is electrically conducting.

10. A thin-film magnetic head as claimed in claim 7, characterized in that the first and second auxiliary tracks, respectively, are part of the first and second electrically conducting layers, respectively.

\* \* \* \* \*